Sept. 22, 1953　　　　　D. D. GRAY　　　　　2,652,953
DEVICE FOR MEASURING AND DISCHARGING FLUIDS
DELIVERED THERETO UNDER PRESSURE
Filed Sept. 8, 1949

INVENTOR
DAVID DOUGLAS GRAY
BY
Toulmin & Toulmin
ATTORNEYS

Patented Sept. 22, 1953

2,652,953

UNITED STATES PATENT OFFICE 2,652,953

DEVICE FOR MEASURING AND DISCHARGING FLUIDS DELIVERED THERETO UNDER PRESSURE

David Douglas Gray, Mosman Park, Western Australia, Australia

Application September 8, 1949, Serial No. 114,522
In Australia June 17, 1949

3 Claims. (Cl. 222—250)

1

This invention relates to a device for measuring and discharging fluids delivered thereto under pressure.

There are many cases when it is necessary to deliver measured quantities of fluids rapidly and with frequent repetition, for example, in filling bottles or other containers, vending lubricating oils, and drenching and inoculating livestock.

The present invention relates to a device for doing this. However, the period between the discharge of each measured volume of fluid and the commencement of the discharge of the next volume is manually controlled, which is necessary in most of the operations above referred to.

In using the device, it is necessary to have the fluid under pressure, but in most cases this need only be a low pressure. Actually, the lower the pressure, the slower the operation becomes.

The size of the device may vary within wide limits. It may be as small as an ordinary fountain pen when it is used for hypodermic injections, and it may be quite large when it is to be used for delivering as much as a pint of fluid or even more at a time.

The invention consists broadly of a device for measuring and delivering fluid supplied thereto under pressure which is characterised in that it has a piston moving in a cylinder, movement in one direction being caused by the pressure of the incoming fluid on one side of the piston, which results in the discharge of fluid on the other side of the piston until the movement has been completed; and a manual control by the operation of which port openings are reversed so that fluid under pressure moves the piston in the opposite direction and the piston simultaneously discharges the fluid that caused its movement during the previous stroke.

The invention will, however, more readily be understood by reference to the accompanying drawings, in which.

Figure 1:
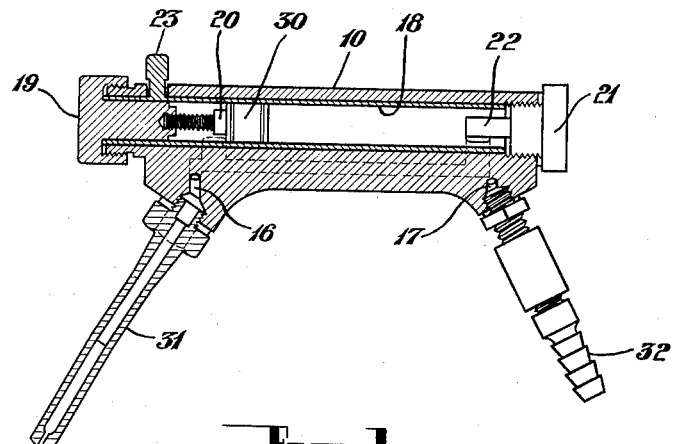
Figure 1 is a side sectional elevation of a form of the device.
Figure 2:
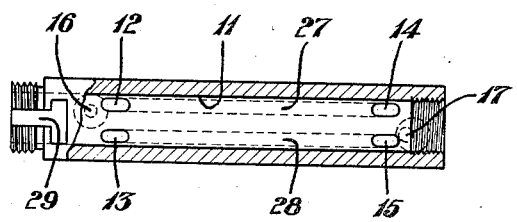
Fig. 2 is a sectional plan of the body portion thereof, whilst.
Figure 3:
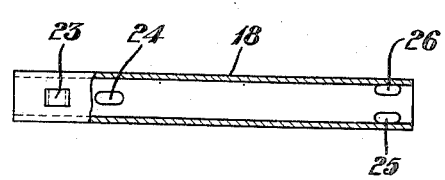
Fig. 3 is a sectional plan of the hollow cylindrical sleeve.

It is to be understood, however, that the invention as illustrated in these drawings is shown by way of example only mainly to explain the functions of the various parts thereof.

2

As shown in these drawings, 10 is the body of the device through which there is a cylindrical passage 11 from end to end. Opening into this cylindrical passage are ports 12, 13, 14 and 15, whilst there is a discharge opening 16 delivering fluid from the device and an inlet opening 17 admitting fluid supplied under pressure thereto.

Adapted to fit inside the cylindrical passage 11 is a hollow cylindrical sleeve 18 open at both ends. At one end this is held in position in the body 10 by means of a screw cap 19 that has a stop extension 20 of smaller cross section extending into the hollow sleeve. At the other end the sleeve is held in position in the body by means of a screw cap 21, also having a stop extension 22 of smaller cross section than the sleeve into which it projects.

Connected to the sleeve at right angles thereto near one end is a control rod 23. In the sleeve itself there are ports 24, 25 and 26. The function of these ports and the ports in the barrel which have previously been referred to will become apparent as the description proceeds.

Associated with the body of the device, conveniently being formed therein, is a discharge manifold 27 which extends nearly the full length of the body and which is in permanent communication with the discharge outlet 16. Also associated with the body, conveniently by being formed therein, is an inlet manifold 28 which extends nearly the full length of the body, and this inlet manifold is in permanent communication with the inlet opening 17.

In the top part of the body at one end is formed a T-shaped slot 29. The purpose of this is to allow the control rod 23 to be moved longitudinally into position when the sleeve is being introduced before the cap 19 is screwed on to hold the sleeve against longitudinal displacement.

Adapted to move inside the hollow sleeve 18 is a solid piston 30, whilst connected to the outlet opening 16 is a discharge nozzle 31, which could of course if so desired be in the form of a hypodermic needle, whilst connected to the inlet opening 17 is the inlet connection 32 that has provision for being connected to a supply of fluid under pressure.

The device operates as follows:

When the control rod 23 is moved in the part of the slot 29 that allows it to turn the sleeve 18, and such sleeve is moved so that the port 24 therein in registering with the port 12 in the body communicating with the discharge manifold, the effect is that the port 25 is brought into alignment wth the port 15 in the body communicating with the inlet manifold 28. In consequence, fluid flows into the sleeve, and being under pressure, moves the piston to the far end of the sleeve, where travel over the ports is prevented by the stop extension 20. Then by moving the sleeve control rod 23 into the other position, the effect is that the port 24 now comes to register with the port 13 communicating with the inlet manifold 28, whilst the port 26 at the other end comes into alignment with the port 14 communicating with the discharge manifold 27 at the other end of the body. Consequently, fluid under pressure flows along the inlet manifold 28, passes up through the port 13, then through the port 24 into the sleeve on the reverse side of the piston 30, and so moves the piston to the other end of the barrel. This of course results in fluid which is actually a measured quantity contained in the barrel on the other side of the piston being forced out through the ports 26 and 14 into the discharge manifold 27, then into the discharge opening 16, and out through the nozzle 31.

Each time that a measured quantity of fluid has been discharged, reversal of the control rod results in reversal of the port openings and so reversal of the direction in which fluid under pressure enters the sleeve and operates the piston. Consequently, as soon as one measured volume of fluid has been discharged, the control rod can be moved, and this results in the immediate discharge of another measured volume of fluid, and this can go on as long as is required.

It will be apparent that the extent of the travel of the piston 30 can be controlled by the extent that the stop extension 20 projects into the sleeve.

It will also be apparent that the length of the piston can be varied. This gives a simple means for varying the amount of the measured quantity of fluid which is discharged at each operation.

I claim:

1. A device for measuring and dispensing fluids supplied thereto under pressure which comprises a cylindrical body having a rotatable hollow sleeve fitted therein, said cylindrical body being closed at its opposite ends, a piston reciprocable in said sleeve under the influence of said fluid pressure, a manifold extending longitudinally of said cylindrical body, a fluid passageway in said manifold having port openings contiguous with said sleeve and which passageway is in communication with a discharge outlet, a second fluid passageway in said manifold having port openings contiguous wth said sleeve and which passageway is in communication with an inlet opening, said sleeve having a port near one end whch is adapted upon rotation of the sleeve about its longitudinal axis to be placed alternately in communication with said fluid passageway connected to said outlet and said fluid passageway connected to said inlet, said sleeve having a pair of ports near the opposite end from said first mentioned sleeve port, one of said pair of ports being adapted upon rotation of said sleeve to place the piston chamber of the sleeve in communication with said inlet fluid passageway and the other of said pair of ports being adapted upon rotation of said sleeve in the opposite direction to place said piston chamber of the sleeve in communication with said outlet fluid passageway, and means for rotating said sleeve.

2. A device for measuring and dispensing fluids supplied thereto under pressure which comprises a cylindrical body, a rotatable hollow sleeve mounted therein, said cylindrical body having an inlet and outlet opening and being closed at its opposite ends by removable plugs, said plugs comprising reduced diameter portions which extend into said hollow sleeve, a piston reciprocable in said sleeve under the influence of said pressure, said cylindrical body having a manifold extending longitudinally thereof, a fluid passageway in said manifold which is in communication with said outlet, ports in said cylindrical body for communicating with said fluid passageway, a second fluid passageway in said manifold which is in communication with said inlet opening, ports in said cylindrical body for communicating with said second fluid passageway, said sleeve having a port therein which is adapted upon rotation of said sleeve about its longitudinal axis in one direction to be placed into registration with a port in said cylindrical body which communicates with said discharge fluid passageway and upon rotation of said sleeve in the opposite direction to be placed into registration with a port in said cylndrical body which communicates with said inlet fluid passageway, said sleeve having a plurality of ports spaced from said first mentioned port and which are adapted to be brought in registration with ports in said cylindrical body, said first-mentioned port in said sleeve being adapted upon rotation of said sleeve in one direction to be placed in registration with an inlet port of said cylindrical body while another port in said sleeve and spaced from said first-mentioned port is simultaneously placed in registration with an outlet port in said cylindrical body and, upon rotation of said sleeve in the opposite direction, is placed in registration with an outlet port of said cylindrical body while another port in said sleeve spaced from said first-mentioned port is simultaneously placed in registration with an inlet port in said cylindrical body, and means for rotating said sleeve.

3. A device for measuring and dispensing fluids supplied thereto under pressure which comprises a cylindrical body, a rotatable hollow sleeve fitted thereto, said cylindrical body being closed at its opposite ends by removable plugs, said plugs comprising stop extensions thereon constituting a smaller diameter section than said sleeve and projecting inwardly along the central longitudinal axis of said sleeve, a piston reciprocable in said sleeve under influence of said pressure, at least one of said stop extensions being adjustable for limiting the travel of said piston, said cylindrical body having a manifold portion, a fluid passageway in said manifold portion having ports communicating therewith at opposite ends of the cylindrical body, a second passageway in said manifold having ports communicating therewith at opposite ends of the cylindrical body, said cylindrical body having an inlet and an outlet communicating with said first and second mentioned fluid passageways, said sleeve having a port near one end which is adapted upon rotation of the sleeve about its longitudinal axis to be placed alternately in communication with said fluid passageway connected to said outlet and said fluid passageway connected to said inlet, said sleeve having a pair of ports near the opposite end from said first mentioned sleeve port, one of said pair of ports being adapted upon rotation of said sleeve to place the piston chamber of the sleeve in communication with said inlet fluid passageway, and the other of said pair of ports being adapted upon rotation of said sleeve in the opposite direction to place said piston chamber of the sleeve in communication with said outlet fluid passageway, and means for rotating said sleeve.

DAVID DOUGLAS GRAY.

References Cited in the file of this patent

UNITED STATES PATENTS

| Number | Name | Date |
|---|---|---|
| 397,452 | Winters et al. | Feb. 5, 1889 |
| 582,369 | Parker | May 11, 1897 |
| 1,708,482 | McClatchie | Apr. 9, 1929 |

FOREIGN PATENTS

| Number | Country | Date |
|---|---|---|
| 727,367 | France | Mar. 22, 1932 |